(12) United States Patent
Chalk et al.

(10) Patent No.: US 10,876,634 B2
(45) Date of Patent: Dec. 29, 2020

(54) ANNULAR SEALING ASSEMBLY

(71) Applicant: Air Products and Chemicals, Inc., Allentown, PA (US)

(72) Inventors: David Jonathan Chalk, Slatington, PA (US); Gregory Peter Hupp, Allentown, PA (US); Douglas R. Williams, Allentown, PA (US); Lance Michael Grimm, Bowmanstown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 111 days.

(21) Appl. No.: 16/387,711

(22) Filed: Apr. 18, 2019

(65) Prior Publication Data
US 2020/0332900 A1    Oct. 22, 2020

(51) Int. Cl.
| | | |
|---|---|---|
| *F16J 15/26* | (2006.01) | |
| *F16J 15/34* | (2006.01) | |
| *F16J 15/56* | (2006.01) | |
| *F16J 15/00* | (2006.01) | |
| *F04B 39/04* | (2006.01) | |

(52) U.S. Cl.
CPC ......... *F16J 15/3412* (2013.01); *F04B 39/041* (2013.01); *F16J 15/002* (2013.01); *F16J 15/3452* (2013.01); *F16J 15/56* (2013.01); *F05B 2240/57* (2013.01)

(58) Field of Classification Search
CPC .... F16J 15/3412; F16J 15/002; F16J 15/3452; F16J 15/56; F04B 39/041
See application file for complete search history.

(56) References Cited

U.S. PATENT DOCUMENTS

| | | |
|---|---|---|
| 3,271,037 A | 9/1966 | Hammond |
| 3,305,241 A | 2/1967 | Hart |
| 3,542,374 A | 11/1970 | Neilson et al. |
| 3,575,424 A | 4/1971 | Taschenberg |
| 3,711,104 A | 1/1973 | Henry |
| 31,329 A | 8/1983 | Parker |
| 6,439,578 B1 | 8/2002 | Radcliffe |
| 2009/0108535 A1 | 4/2009 | Lindner-Silwester |
| 2009/0289422 A1 | 11/2009 | Lindner-Silwester |
| 2010/0072712 A1 | 3/2010 | Hold |

FOREIGN PATENT DOCUMENTS

AT    505549 B    2/2009

*Primary Examiner* — Gilbert Y Lee
(74) *Attorney, Agent, or Firm* — Matthew R. Weaver

(57) ABSTRACT

An annular seal assembly for use in a fluid mover, such as a compressor, having a tangentially-cut ring assembly and a radially-cut ring assembly, each ring assembly having arcuate segments, where each arcuate segment of the tangentially-cut ring assembly has a plurality of passages extending from the outer peripheral face to within at least 1.0 mm of the inner peripheral face, wherein after wearing in of the seal, the passages extend through the tangentially-cut ring assembly for pressure balancing.

14 Claims, 8 Drawing Sheets

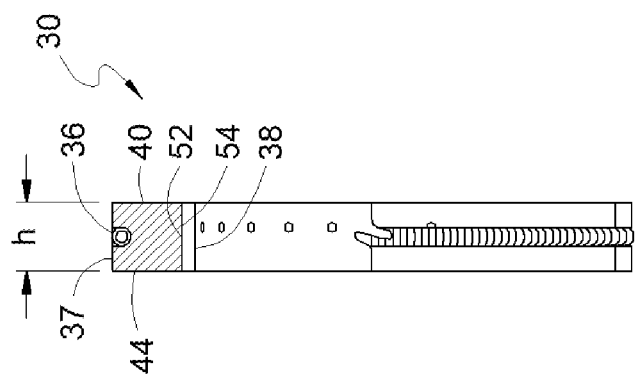
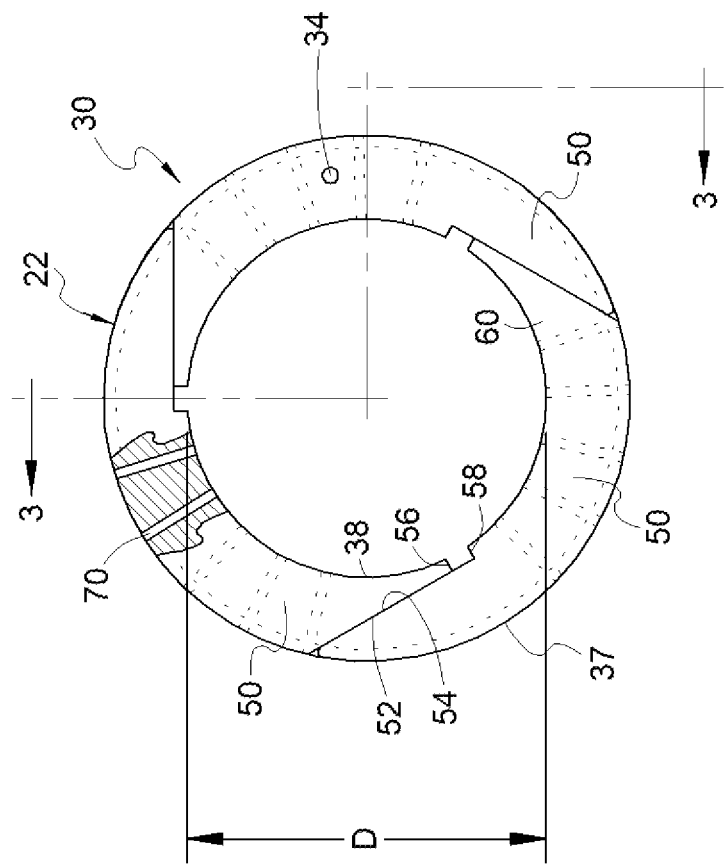
FIG. 3
FIG. 2

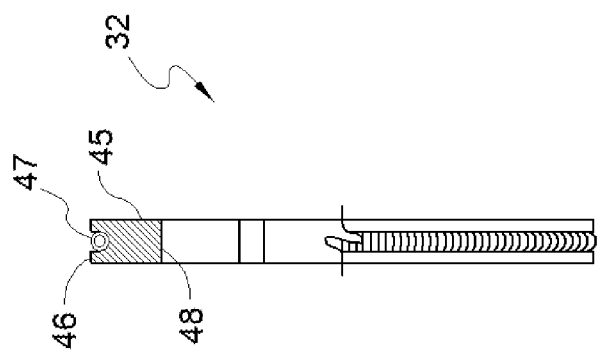
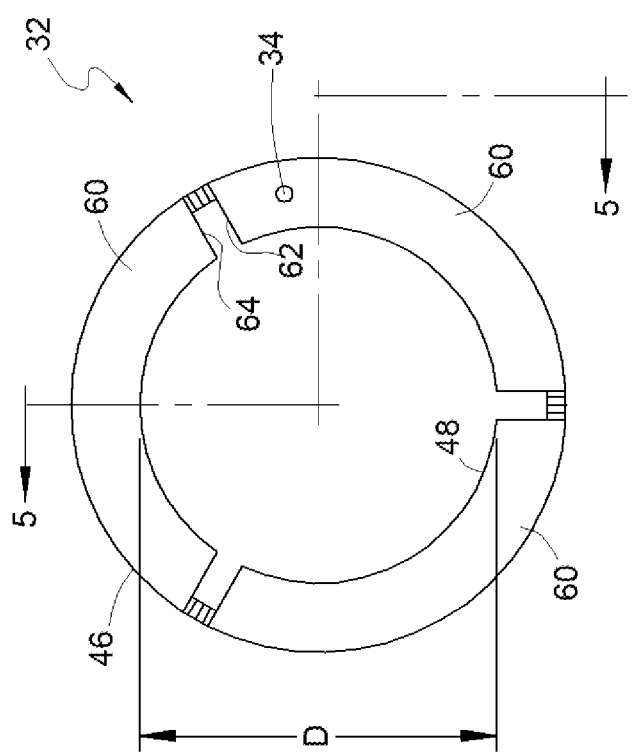

ANNULAR SEALING ASSEMBLY

BACKGROUND

This disclosure relates, generally, to annular seal assemblies for use in reciprocating pumps, compressors, or the like. More particularly, and not by way of limitation, this disclosure relates to an annular seal assembly with pressure balancing.

Seals for use in compressors and pumps operating above 172 MPa (25,000 psia) have been constructed from sets of segmented annular members with the joints between the segments being offset between adjacent annular members. A first one of the annular members, that it, the one on the lower pressure side of the seal, functions to seal against the plunger or rod reciprocating in the compressor, while the other annular member functions to close the joints between the segments of the first annular member. Such a seal structure is illustrated, for example, in U.S. Pat. Nos. 3,542,374 and 3,711,104.

In U.S. Pat. No. 3,542,374, the seal rings forming the seal assembly are constructed from segments having adjacent sealing faces. One ring has tangentially-cut end surfaces and the other ring has radially-cut end surfaces with the end surfaces being circumferentially displaced so as to not overlap. Seals constructed in this manner perform satisfactorily. However, in very high pressure service, considerable force is exerted on the reciprocating rod by the seal rings due to the high pressure. Such high forces result in relatively poor lubricating characteristics and, thus, a short seal life due to the high degree of wear thereon.

As a result, a number of modifications have been proposed throughout the years to provide pressure balancing of the seal in an effort to reduce the forces and wear, and thereby improve the seal life. Examples of these modifications are disclosed in U.S. Pat. No. 3,711,104, and U.S. Pat. Appl. Publ. No. 2009/0108535 A1.

Many of the proposed modifications are complicated and difficult to manufacture.

Industry desires improved annular seal assemblies for use in high-pressure compressors and the like that provide excellent sealing characteristics with reduced wear and longer life.

Industry desires improved annular seal assemblies that can be quickly and easily assembled, and are self-compensating for wear.

Industry desires improved annular seal assemblies that are easy to manufacture.

BRIEF SUMMARY

The present disclosure relates to annular seal assemblies.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An annular seal assembly (22) for use in a fluid mover (10) with a cylinder (14) having an annular groove (24) therein for receiving said seal assembly (22), the annular groove (24) having a first radial wall (26) and a second radial wall (28), the fluid mover having a reciprocating rod (12), which reciprocates in the cylinder (14) through the seal assembly (22), the seal assembly (22) comprising:

a tangentially-cut ring assembly (30) receivable in the annular groove (24), the tangentially-cut ring assembly (30) having an outer peripheral face (37) and an inner peripheral face (38), the inner peripheral face (38) for sealingly engaging the reciprocating rod (12) and defining an inner diameter, D, the tangentially-cut ring assembly (30) having a first annular face (44) forming a first seal surface and a second annular face (40) arranged to sealingly engage the first radial wall (26) of the annular groove (24), the first annular face (44) and the second annular face (40) defining a thickness, h, therebetween, the tangentially-cut ring assembly (30) comprising a plurality of arcuate segments (50); and a radially-cut ring assembly (32) receivable in the annular groove, the radially-cut ring assembly (32) having an outer peripheral face (46) and an inner peripheral face (48), the inner peripheral face (48) for engaging the reciprocating rod (12), the radially-cut ring assembly (32) having an annular face (45) sealingly engaged with the first seal surface of the tangentially-cut ring assembly (30), the radially-cut ring assembly (32) comprising a plurality of arcuate segments (60);

wherein the tangentially-cut ring assembly (30) has a plurality of passages (70) extending from the outer peripheral face (37) of the tangentially-cut ring assembly (30) to within at least 1.0 mm of the inner peripheral face (38) of the tangentially-cut ring assembly (30), each passage of the plurality of passages (70) having a respective diameter, $d_i$, wherein $d_i < 2.6$ mm, for each passage i, wherein each passage of the plurality of passages (70) at the inner peripheral face (38) of the tangentially-cut ring assembly (30) is at least a distance of 1.5 mm from the second annular face (40) at the inner peripheral face (38) of the tangentially-cut ring assembly (30) and no further than a distance of 0.75×h from the second annular face (40) at the inner peripheral face (38) of the tangentially-cut ring assembly (30); and wherein the plurality of passages (70) in the tangentially-cut ring assembly (30) number at least $$\frac{\pi D}{(3h+d)},$$

where d is the mean value of the diameters of the plurality of passages (70).

Aspect 2. The annular seal assembly (22) as in aspect 1 wherein each passage of the plurality of passages (70) extends to within at least 0.5 mm of the inner peripheral face (38) of the tangentially-cut ring assembly (30).

Aspect 3. The annular seal assembly (22) as in aspect 1 or aspect 2 wherein each passage of the plurality of passages (70) extends through a distance no closer than 0.1 mm to the inner peripheral face (38) of the tangentially-cut ring assembly (30).

Aspect 4. The annular seal assembly (22) as in aspect 1 or aspect 2 wherein each passage of the plurality of passages (70) extends through to the inner peripheral face (38) of the tangentially-cut ring assembly (30).

Aspect 5. The annular seal assembly (22) as in aspect 1 wherein the annular seal assembly (22) has an initial installed state and a later operating state, wherein each passage of the plurality of passages (70) extends through a distance no closer than 0.1 mm to the inner peripheral face (38) of the tangentially-cut ring assembly (30) at the initial installed state, and wherein each passage of the plurality of passages extends through to the inner peripheral face (38) of the tangentially-cut ring assembly (30) at the later operating state.

Aspect 6. The annular seal assembly (22) as in aspect 4 wherein there is no groove connecting any passage of the plurality of passages (70) to another passage of the plurality of passages (70) at (along) the inner peripheral face (38) of the tangentially-cut ring assembly (30).

Aspect 7. The annular seal assembly (22) as in any one of aspects 1 to 6 wherein the plurality of arcuate segments (50) of the tangentially-cut ring assembly (30) have mating end surfaces (52, 54) defined by planes extending generally tangent to said inner diameter.

Aspect 8. The annular seal assembly (22) as in any one of aspects 1 to 7 wherein the plurality of arcuate segments (50) of the tangentially-cut ring assembly (30) have planar mating end surfaces (52, 54) which intersect straight radial lines at the inner peripheral face (38) each at an included angle, a, of at least 90° and at most 150° or at most 120°.

Aspect 9. The annular seal assembly (22) as in any one of aspects 1 to 8 wherein the plurality of arcuate segments (60) of the radially-cut ring assembly (32) have radially disposed end surfaces (62, 64) offset circumferentially relative to the mating end surfaces (52, 54) of the plurality of arcuate segments (50) of the tangentially-cut ring assembly (30).

Aspect 10. The annular seal assembly (22) as in any one of aspects 1 to 9 wherein each of the passages of the plurality of passages (70) is spaced apart one from another.

Aspect 11. The annular seal assembly (22) as in any one of aspects 1 to 10 wherein the center-to-center distance between the passage openings of the plurality of passages (70) are equally spaced apart, one from another.

Aspect 12. The annular seal assembly (22) as in any one of aspect 1 to 11 further comprising a retention means (36, 47) for holding the annular seal assembly (22) in the annular configuration and resiliently biasing the seal assembly in the radial direction toward a center region of the annular seal assembly (22) to bias the seal assembly (22) toward the reciprocating rod (12) when located in the annular groove (24).

Aspect 13. The annular seal assembly (22) as in aspect 12 wherein the retention means (36, 47) is an annular spring.

Aspect 14. The annular seal assembly (22) as in any one of aspects 1 to 13 wherein the plurality of passages (70) in the tangentially-cut ring assembly (30) number at most $$\frac{\pi D}{(2d)}.$$

BRIEF DESCRIPTION OF SEVERAL VIEWS OF THE DRAWINGS

FIG. 1 is a partial cross sectional view illustrating the improved seal assembly of the present disclosure located in a compressor, pump, or the like.

FIG. 2 is a plan view of a tangentially-cut ring assembly.

FIG. 3 is a half-sectional view of the tangentially-cut ring assembly taken generally along the line 3-3 of FIG. 2.

FIG. 4 is a plan view of the radially-cut ring assembly.

FIG. 5 is a half-sectional view of the radially-cut ring assembly taken generally along the line 5-5 of FIG. 4.

DETAILED DESCRIPTION OF THE PREFERRED EMBODIMENTS

Figure 1:
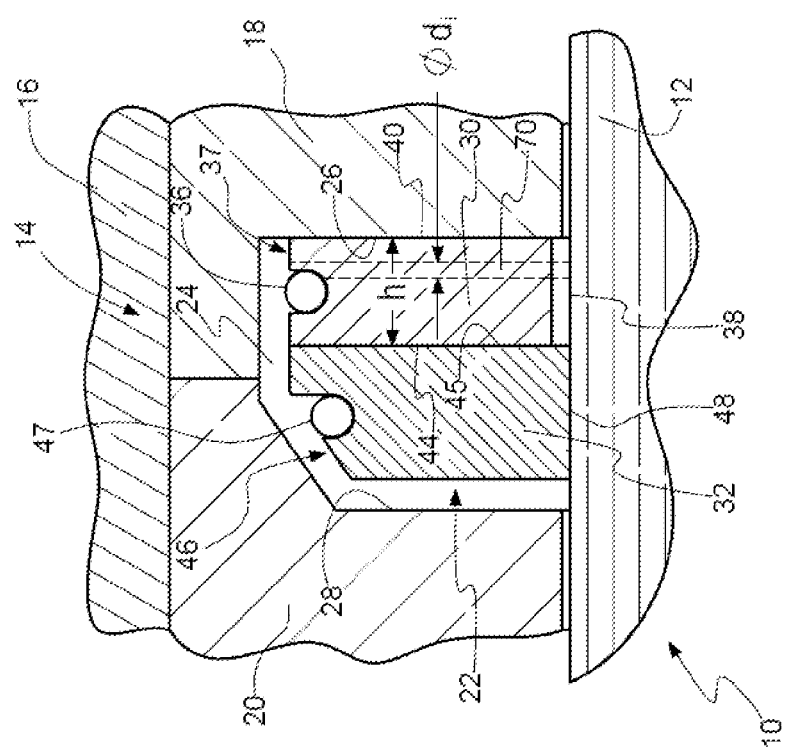

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

In this specification, unless expressly otherwise indicated, the word 'or' is used in the sense of an operator that returns a true value when either or both of the stated conditions are met, as opposed to the operator 'exclusive or' which requires only that one of the conditions is met.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

A detailed description of the preferred embodiments is provided with reference to the figures, wherein like reference numbers refer to like elements throughout.

FIG. 1 illustrates an annular seal assembly 22 according to the present disclosure for use in a fluid mover 10 having a reciprocating rod 12, which reciprocates in the cylinder 14 through the seal assembly 22. The fluid mover 10 may be a pump, compressor, or the like.

The fluid mover 10 has a cylinder 14 with an exterior wall 16 of sufficient thickness to withstand the required internal pressure. The cylinder has an annular groove 24, which may be formed in spacers 18 and 20. The spacers 18 and 20 may be provided so that desired seals, which will include one or more of the seal assemblies 22, can be conveniently positioned in the fluid mover 10.

As shown in FIG. 1, the spacers 18 and 20 may be formed with annular recesses providing an annular groove 24 that is sized to receive the seal assembly 22. The groove 24 includes a first radial (sealing) wall 26 and a second radial (non-sealing) wall 28.

The annular seal assembly 22 comprises a tangentially-cut ring assembly 30 receivable in the annular groove 24. Details of the tangentially-cut ring assembly are shown in FIGS. 2 and 3. The tangentially-cut ring assembly 30 can be made from any suitable material known in the art, for example, filled Teflon, filled PEEK, and other plastics with additives to improve wear resistance.

The tangentially-cut ring assembly 30 has an outer peripheral face 37 and an inner peripheral face 38. The inner peripheral face 38 is for sealingly engaging the reciprocating rod 12. The inner peripheral face 38 defines an inner diameter, D. The tangentially-cut ring assembly 30 has a first annular face 44 forming a first seal surface and a second annular face 40 arranged to sealingly engage the first radial wall 26 of the annular groove 24.

The first annular face 44 and the second annular face 40 define a thickness, h, therebetween. The thickness of the tangentially-cut ring assembly 30 of the present disclosure may be greater than prior art tangentially-cut ring assemblies and may range from 3 mm to 20 mm.

Figure 9:
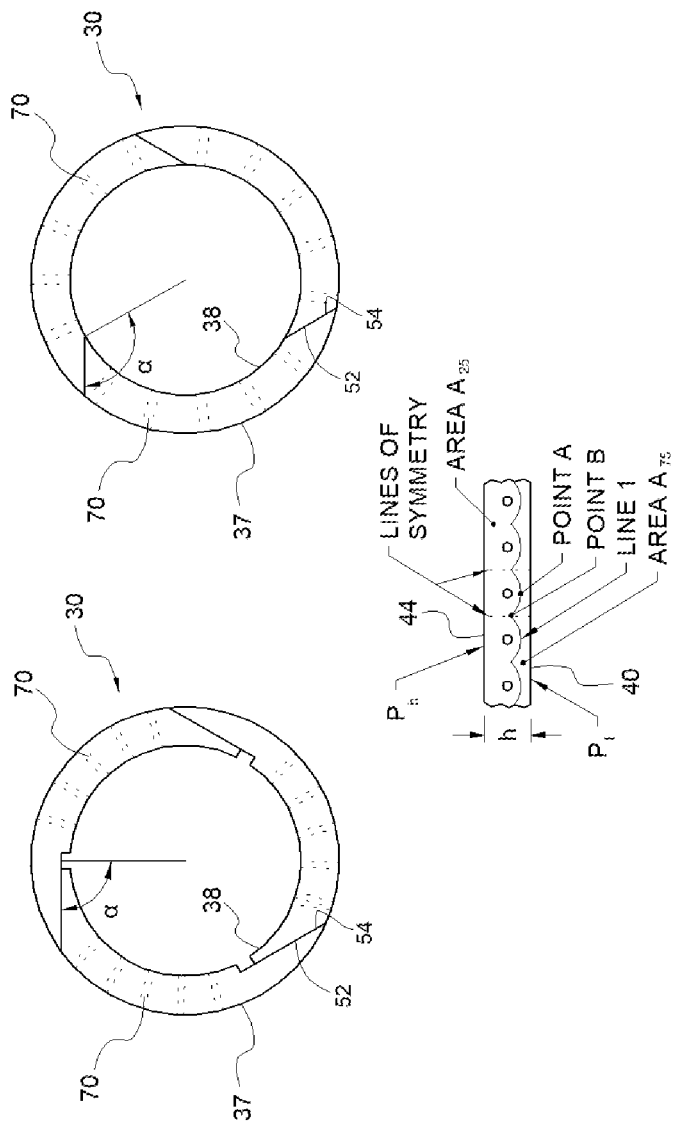
FIG. 9 is an illustration of a section of a tangentially-cut ring assembly for the discussion of the pressure distribution across the seal.

The tangentially-cut ring assembly 30 comprises a plurality of arcuate segments 50. The tangentially-cut ring assembly 30 may have three arcuate segments 50, which may be substantially identical to each other. As shown in FIG. 2, the plurality of arcuate segments 50 of the tangentially-cut ring assembly 30 may have mating end surfaces 52, 54 defined by planes extending generally tangent to or generally parallel to the tangent of the inner diameter or the inner peripheral face 38 of the tangentially-cut ring assembly 30. As shown in FIG. 9, the planar mating end surfaces 52, 54 may intersect straight radial lines at the inner peripheral face 38, each at an included angle, a, of at least 90° and at most 150° or at most 120°.

The end surface 52 of an arcuate segment 50 is in sealing engagement with and slidable relative to an end surface 54 that is formed on the opposite end of another of the arcuate segments 50. Each of the arcuate segments 50 may stay in a sliding contact with each of its circumferentially neighbouring arcuate segments 50 along the mating end surfaces 52, 54.

The annular seal assembly 22 comprises a radially-cut ring assembly 32 receivable in the annular groove 24. Details of the radially-cut ring assembly 32 are shown in FIGS. 4 and 5. The radially-cut ring assembly 32 can be made from any suitable material known in the art, and is typically made from the same material that the tangentially-cut ring assembly 30 is made from.

The radially-cut ring assembly 32 has an outer peripheral face 46 and an inner peripheral face 48. The inner peripheral face 48 is for engaging the reciprocating rod 12. The radially-cut ring assembly 32 has an annular face 45 sealingly engaged with the first seal surface of the tangentially-cut ring assembly 30. The radially-cut ring assembly 32 comprises a plurality of arcuate segments 60. The radially-cut ring assembly 32 may have three arcuate segments 60, which may be substantially identical to one another.

As shown in FIG. 4, the plurality of arcuate segments 60 of the radially-cut ring assembly 32 have radially disposed end surfaces 62, 64. The end surfaces 62 and 64 on adjacent arcuate segments 60 may be spaced to permit a reduction in diameter of the inner peripheral face 48 of the radially-cut ring assembly 32 in the event that wear does occur thereon. When placed together adjacent the tangentially-cut ring assembly 30, the radially disposed end surfaces 62, 64 are offset relative to the mating end surfaces 52, 54 of the plurality of arcuate segments 50 of the tangentially-cut ring assembly 30.

As shown in FIGS. 2 and 4, a locating pin 34 may be provided to maintain a proper circumferential offset of the radially disposed end surfaces 62, 64 of the radially-cut ring assembly 32 and the mating end surfaces 52, 54 of the plurality of arcuate segments 50 of the tangentially-cut ring assembly 30. The locating pin 34 fixes the tangentially-cut ring assembly 30 relative to the radially-cut ring assembly 32 so that the end surfaces 62 and 64 of adjacent members 60 are offset from the adjacent end surfaces 52 and 54 of the members 50. With this arrangement, the radially-cut ring assembly 32 closes and seals the space existing between the end surfaces 52 and 54 on adjacent members 50 of the tangentially-cut ring assembly 30. The locating pin 34 is exemplary, as any known means for maintaining the proper offset may be used.

The tangentially-cut ring assembly 30 has a plurality of passages 70, which may be spaced apart. On the outer peripheral face 37, center-to-center distance between the passage openings may be equally spaced. Each arcuate segment of the plurality of arcuate segments 50 of the tangentially-cut ring assembly 30 has passages. The plurality of passages 70 extend from the outer peripheral face 37 of the tangentially-cut ring assembly 30 to within at least 1.0 mm of the inner peripheral face 38 of the tangentially-cut ring assembly 30. Extending to within at least 1.0 mm of the inner peripheral face 38 of the tangentially-cut ring assembly 30 means that no more than 1.0 mm of material is present at the end of the passage at the inner peripheral face 38. One or more or all of the plurality of passages 70 may extend from the outer peripheral face 37 to the inner peripheral face 38, i.e. through the tangentially-cut ring assembly 30, or end in the tangentially-cut ring assembly 30 at a radial distance of no more than 1.0 mm from the inner peripheral face 38. Preferably, no passage of the plurality of passages 70 is connected to another passage of the plurality of passages 70 by any groove or the like along the inner peripheral face 38 of the tangentially-cut ring assembly 30. Material between the passages helps improve the wear characteristics of the annular seal assembly 22.

Figure 7:
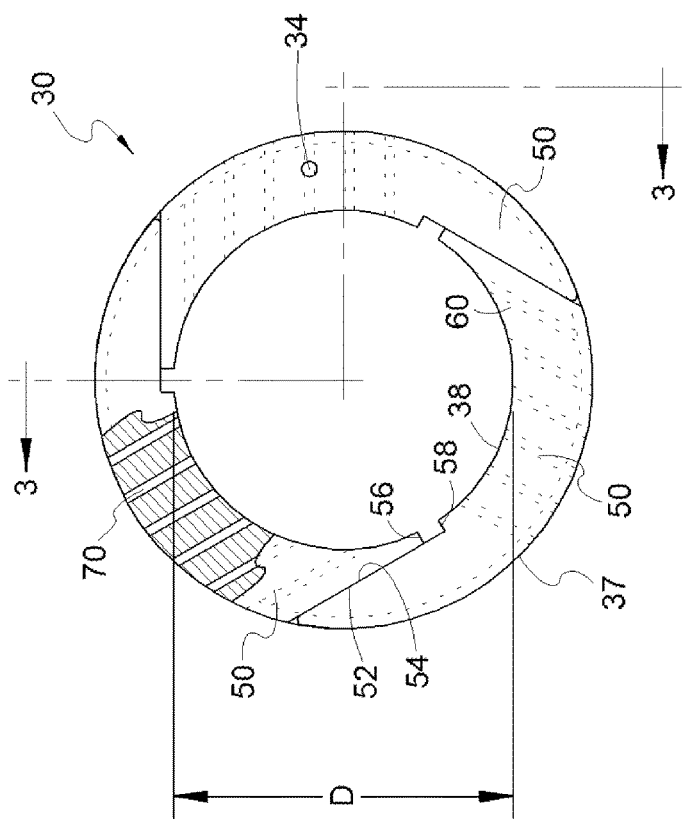
FIG. 7 is a plan view of a tangentially-cut ring assembly.
Figure 6:
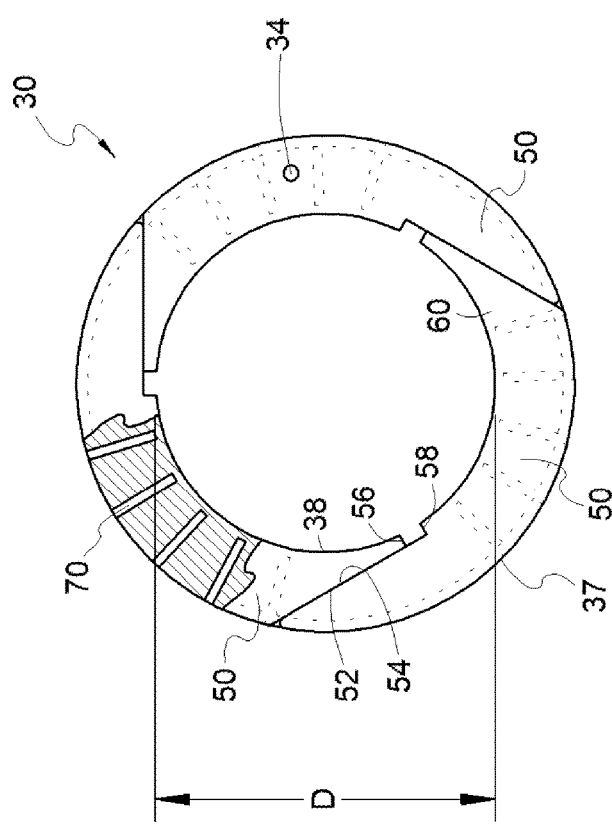
FIG. 6 is a plan view of a tangentially-cut ring assembly.

Each passage of the plurality of passages may extend radially from the geometric center of the tangentially-cut ring assembly 30 as shown in FIG. 6. Alternatively, the passages in an individual arcuate segment may run parallel to each other, for example, parallel to one of the mating end surfaces 52, 54 of the tangentially-cut ring assembly 30 as shown in FIG. 7. The passages may extend from the outer peripheral face 37 toward the inner peripheral face 38 of the tangentially-cut ring assembly 30 in any suitable manner.

At the time of installing the annular seal assembly 22 in the annular groove 24, each passage of the plurality of passages 70 may extend through a distance no closer than 0.1 mm to the inner peripheral face 38 of the tangentially-cut ring assembly 30. FIG. 6 shows the passages not extending completely through to the inner peripheral face 38. Extending through a distance no closer than 0.1 mm to the inner peripheral face 38 of the tangentially-cut ring assembly 30 means that no less than 0.1 mm of material is present at the end of the passage at the inner peripheral face 38. A bit of material in each passage 70 at the inner peripheral face 38 may be provided for improved wearing-in of the annular seal assembly 22.

When no material is provided at the inner peripheral face 38 and through-passages are provided from the outer peripheral face 37 to the inner peripheral face 38 of the tangentially-cut ring assembly 30 at the time of installation, the passages may leak during initial operation at a level too high for operation and/or too high for the seal to wear-in effectively. The seal needs to wear-in and take the shape of the shaft that it is riding on to seal satisfactorily and this cannot happen if there is severe leakage through the passages and out to the low pressure side.

The passages may be drilled from the outer diameter (outer peripheral face 37) without piercing through the inner diameter (inner peripheral face 38). A bit of material extending radially from the inner peripheral face 38 of the passage to about 0.1 mm to 1 mm into the passage may be left behind so that the seal could wear-in before the pressure balancing of the seal is accomplished which occurs later during operation. After wearing-in and during a later operating state, each passage of the plurality of passages 70 extends through to the inner peripheral face 38 of the tangentially-cut ring assembly 30. At this point during the later operating state, the seal has worn-in sufficiently so that the entire surface of the seal is in good contact with the shaft.

The tangentially-cut ring assembly 30 and/or the radially-cut ring assembly 32 may be made by additive manufacturing (e.g. 3-D printing).

Each passage of the plurality of passages 70 has a respective diameter, $d_i$, wherein $d_i < 2.6$ mm, for each passage i. The respective diameter, $d_i$, for each passage i may be at least 0.5 mm. The lower limit for the diameter of a passage is chosen for practical limitations relating to use of a drill bit that doesn't readily break due to its small diameter, and the upper limit is chosen to be relatively small compared to the seal's thickness, h, to allow for sufficient material around the hole (passage) to act as a sealing surface. In case the cross section of any of the passages of the plurality of passages is not circular, the diameter is the hydraulic diameter.

Figure 11:
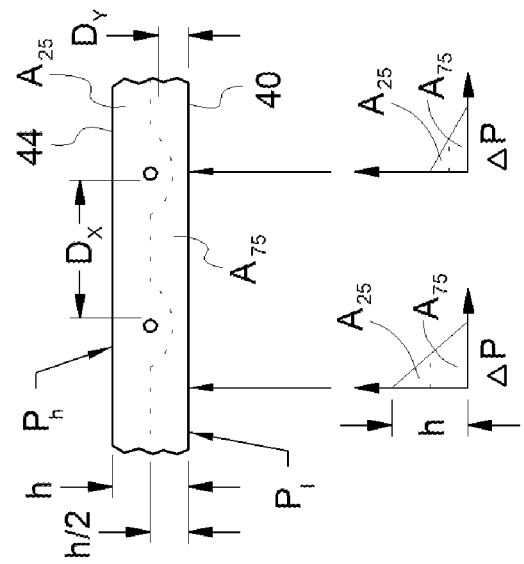
FIG. 11 is an illustration of a section of a tangentially-cut ring assembly for the discussion of the pressure distribution across the seal.

The closest edge of each passage of the plurality of passages 70 at the inner peripheral face 38 of the tangentially-cut ring assembly 30 is at least a distance, $D_{y,min}$, of 1.5 mm and no further than a distance, $D_y$,max, of 0.75×h from the second annular face 40 at the inner peripheral face 38 of the tangentially-cut ring assembly 30 (FIG. 11). The minimum distance of 1.5 mm is chosen as this is a minimum required to affect a seal between the hole (passage) and a bottom edge of the second annular face 40. The bottom edge is an edge where the inner peripheral face 38 and the second annular face 40 meet. The bottom edge may define an axial end of a sealing gap between the tangentially-cut ring assembly 30 and the rod 12 when the annular seal assembly 22 is located in the annular groove 24.

If the hole is drilled even closer than 1.5 mm to the bottom edge, there is a sharp rise in the amount of leakage through the hole and to the bottom edge of the second annular face 40. The maximum distance of 0.75×h is chosen to provide some minimal pressure balancing effect. If the holes are drilled at more than 0.75×h, the benefit of the pressure balancing will be largely negated.

With respect to pressure balancing, the outer peripheral face 46 and the inner peripheral face 48 of the radially-cut ring assembly 32 are exposed to the higher pressure. For the tangentially-cut ring assembly 30, the pressure difference between the outer peripheral face 37 and the inner peripheral face 38 and the resulting force of the tangentially-cut ring assembly 30 on the reciprocating rod 12 depends on the location of the passages 70 between the first annular face 44 and the second annular face 40, and number of passages 70 in the tangentially-cut ring assembly 30.

The plurality of passages 70 number at least $$\frac{\pi D}{(3h + d)},$$

where D is the inner diameter of the inner peripheral face 38 of the tangentially-cut ring assembly 30, h is the thickness of the tangentially-cut ring assembly, and d is the mean value of the diameters of the plurality of passages 70.

A suitable number of passages may be determined from a simplified analysis.

The leakage of fluid across the face of a sliding packing produces a gradual pressure drop from the high-pressure side of the seal assembly to the low-pressure side of the seal assembly. The restriction to this leakage is a function primarily of the microscopic gap between the inner peripheral face 38 of the seal assembly and the reciprocating rod surface. The gap is relatively constant across the face of the seal, therefore the restriction to flow is constant over the entire leakage path. To study how the pressure drop is produced across the face, one can consider the leakage path to be a very large number of equal flow restrictions. For an incompressible fluid, each of the restrictions produces a pressure drop that is independent of the pressure. For a compressible fluid, the gas leakage across each restriction is proportional to $(P_h^2 - P_l^2)^{0.5}$, where $P_h$ is the pressure on the high-pressure side of the restriction, and $P_l$ is the pressure on the low-pressure side of the restriction.

Figure 8:
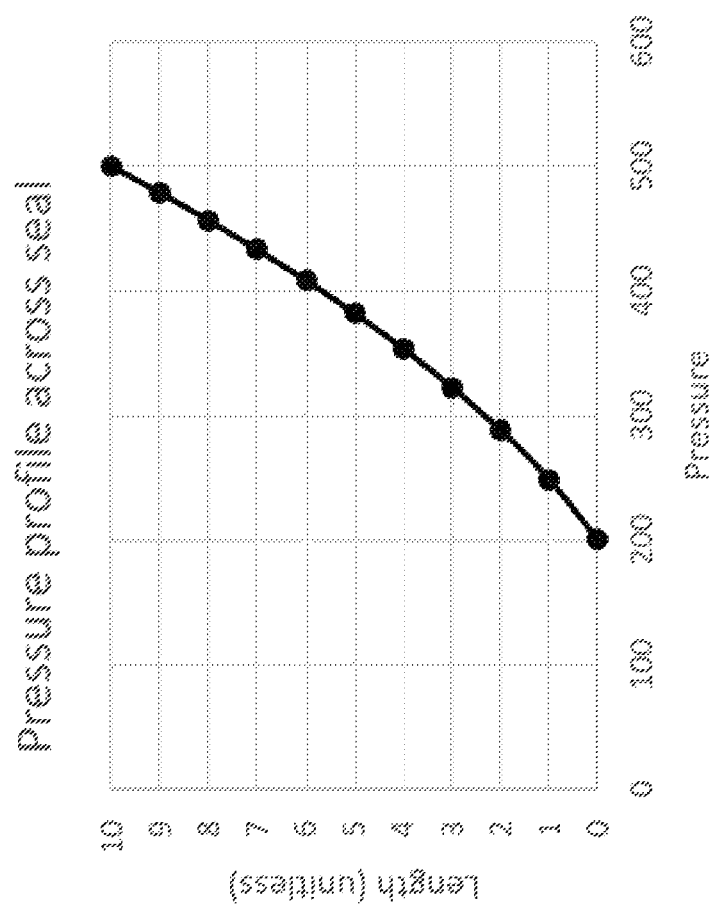
FIG. 8 is a plot of the pressure profile across a seal.

A plot of the pressure profile across the thickness of the seal for a high pressure, $P_h$, of 500 (any pressure units) and a low pressure, $P_l$, of 200 (same pressure units as high pressure) is shown in FIG. 8 for a series of 10 restrictions. The pressure drop profile closely approximates a curve. However, the curve is relatively linear so that an approximation of a linear pressure profile across the seal is a useful first approximation.

Determining a two-dimensional pressure profile across the face of a sealing surface is more complicated. Using the first approximation of how pressure varies across the seal face, the pressure at various points across the face of the seal can be approximated. At any point on the seal face, the pressure can be approximated as linearly proportional to the pressure between any 2 point of known pressure. For a simple, one-dimensional solid seal with a high pressure on one side of the seal and a lower pressure on the other side seal, the pressure profile across the face is independent of its location along the circumference of the seal.

When the passages of the present disclosure are included in tangentially-cut seal rings, the pressure distribution across the seal face is no longer one-dimensional. A linear approximation between 2 points of known pressure can still be assumed, however the pressure is also affected by the various paths a fluid can take between any 2 points of known pressure.

FIG. 9 illustrates two different tangent cut designs in a tangentially-cut seal ring, each having a plurality of equidistant passages. Each passage is placed midway between the first annular face 44 and the second annular face 40 of the tangentially-cut seal ring 30. For equidistant passages, lines of symmetry can be located between the passages so that only one section needs to be considered.

Referring to FIG. 9, point A is equidistant from the edge of a passage where the seal sees the high pressure from one of the many passages 70, $P_h$, and the bottom edge where the seal sees the low pressure $P_l$. The pressure profile from the passage to point A to the low-pressure edge will follow a roughly linear curve as an approximation. This pressure profile follows the shortest route between the 2 known pressures.

For the case where the passages are midway between the first annular face 44 and the second annular face 40 of the tangentially-cut seal ring, the pressure distribution has moved roughly half the way towards the low-pressure face as compared to a seal with no passages. The pressure directly above the passage is still at $P_h$ such that the force from the pressure acting on the inside face 38 and outside face 50 is equal and no contact force is created by the pressure anywhere directly above the passage.

Referring to FIG. 9, at point B, the fluid must travel a longer route that is equally far from both the passage and the low-pressure edge. Wavy line 1 connects all points that are equidistant from both the passage and the low-pressure edge of the tangentially-cut seal assembly so the pressure anywhere on wavy line 1 is approximated by $$P = P_l + \frac{(P_h - P_l)}{2}.$$

The pressure exerted on the seal face by the fluid being sealed is closer to $P_l$ below this line and closer to $P_h$ above this line. Further, we can assume the pressure varies linearly from line 1 to anywhere along the bottom edge where pressure is $P_l$ and also to anywhere along the top edge or to a hole where pressure is $P_h$.

To a first approximation, the area, $A_{75}$, constitutes the area where 75% of the contact load is created on the inner peripheral face 38 of the tangentially-cut seal by the pressure differential, $P_h$-$P_l$. The force on the seal created by this pressure differential is reduced as a linear function of the area $A_{75}$. In other words, to a first approximation, if the area producing 75% of the pressure load on the seal face is reduced by 50%, then the force and subsequent contact stress produced by this portion of the pressure load is also reduced by 50%.

Figure 10:
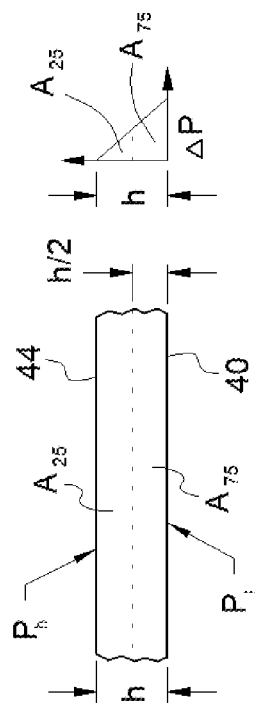
FIG. 10 is an illustration of a section of a prior art tangentially-cut ring assembly for the discussion of the pressure distribution across the seal.

The pressure profile for a traditional seal is shown in FIG. 10. Here, the pressure exerted by the fluid on the seal face is linearly proportional to the distance from the seal faces such that 25% of the contact load, L, is above the midpoint of the seal and 75% is created below the midpoint. This contact load is proportional to the areas, $A_{25}$ and $A_{75}$ shown on the graph.

By introducing a passage 70 for high pressure fluid to enter the seal in the center of the seal face, the location of median pressure moves downwards as shown in FIG. 11. This reduces the area $A_{75}$ by 50%. It also increases the area $A_{25}$ that experiences the remaining 25% of the load. If a standard seal experiences a load L caused by the pressure differential across the seal, then this area shift caused by adding pressure balancing holes reduces the overall load on the seal to 0.5×$A_{75}$×0.75L+1.5×$A_{25}$×0.25L=0.75L, assuming that $A_{75}$ and $A_{25}$ are the areas $A_{75}$ and $A_{25}$ of the seal shown in FIG. 10, i.e. that the areas $A_{75}$ and $A_{25}$ are of equal size and both being 1 (for the sake of simplicity). However, the pressure distribution across area $A_{25}$ is not simply a linear distribution from the top surface 44, to line 1. It is also affected by the presence of the holes (passages).

Between line 1 and the high pressure face of the seal, there is a further breakdown in pressure. Another line can be drawn where the pressure acting on the face of the seal is at or very close to $P_h$. To determine this line, multiple leak paths from the high-pressure side to the low-pressure side must be considered. The resulting area which produces the remaining 25% of the contact pressure is much more difficult to determine but is clearly smaller than the entire remaining area of the seal face. To determine the actual 2 dimensional pressure distribution across the entire seal face would require a numerical analysis be performed for a specific geometry.

Figure 12:
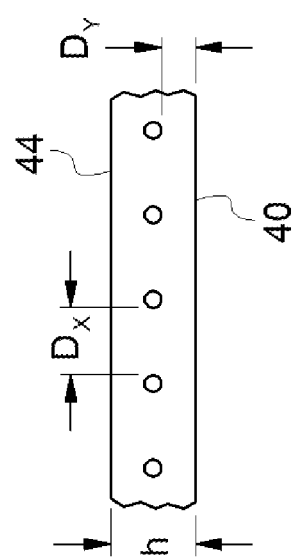
FIG. 12 is an illustration of a section of a tangentially-cut ring assembly for the discussion for the number of recommended passages and passage spacing.

The distance between passages along the circumference of the seal inner peripheral face should preferably be no greater than twice the distance from the passage to the low-pressure face at $P_l$. FIG. 11 demonstrates that any larger distance will reduce the effectiveness of the pressure balancing by essentially not reducing Area $A_{75}$ as much as is practical, thus not reducing the contact pressure. Referring to FIG. 12, the distance $D_X$ should be less than or equal to 4 $D_Y$.

The preferred minimum number of passages can be determined from the circumference, C, of the inner peripheral face 38 of the tangentially-cut ring assembly 30, and the recommended maximum distance between passages, $D_{x,max}$, assuming roughly equal distances between passages. The circumference, C, equals πD. The center-to-center distance of the passages is $D_x$+d, where d is the mean diameter for the passages. The preferred minimum number of passages, $n_{min}$, is $$\frac{\pi D}{(D_{x,max} + d)}$$

where $D_{x,max}$ is the maximum recommended distance between passages.

As stated above, it is recommended that $D_x$<4*$D_y$, so $D_{x,max}$=4$D_y$. The largest value for $D_y$ is 0.75*h, so substituting, $D_{x,max}$=3*h.

The preferred minimum number of passages, $n_{min}$, is $$\frac{\pi D}{(3h + d)}.$$

The maximum number of passages, $n_{max}$, may be determined from practical considerations. It is preferred that there is at least some material between the passages at the inner peripheral face 38. The amount of material may be such that at least one mean diameter, d, exists between each passage. Then the maximum number of passages, $n_{max}$, may be $$\frac{\pi D}{(2d)}.$$

As in prior art designs, the annular seal assembly 22 may further comprise retention means. The retention means holds the ring assemblies in the annular configuration and resiliently biases the seal assembly toward the reciprocating rod when located in the annular grouve 24. FIGS. 1-3 show retention means 36 holding the tangentially-cut ring assembly 30. FIGS. 1 and 5 show retention means 47 holding the radially-cut ring assembly 32. The retention means 36 may be an annular spring.

We claim:

1. An annular seal assembly for use in a fluid mover with a cylinder having an annular groove therein for receiving said seal assembly, the annular groove having a first radial wall and a second radial wall, the fluid mover having a reciprocating rod, which reciprocates in the cylinder through the seal assembly, the seal assembly comprising:

a tangentially-cut ring assembly receivable in the annular groove, the tangentially-cut ring assembly having an outer peripheral face and an inner peripheral face, the inner peripheral face for sealingly engaging the reciprocating rod and defining an inner diameter, D, the tangentially-cut ring assembly having a first annular face forming a first seal surface and a second annular face arranged to sealingly engage the first radial wall of the annular groove, the first annular face and the second annular face defining a thickness, h, therebetween, the tangentially-cut ring assembly comprising a plurality of arcuate segments; and a radially-cut ring assembly receivable in the annular groove, the radially-cut ring assembly having an outer peripheral face and an inner peripheral face, the inner peripheral face for engaging the reciprocating rod, the radially-cut ring assembly having an annular face sealingly engaged with the first seal surface of the tangentially-cut ring assembly, the radially-cut ring assembly comprising a plurality of arcuate segments;

wherein the tangentially-cut ring assembly has a plurality of passages extending from the outer peripheral face of the tangentially-cut ring assembly to within at least 1.0 mm of the inner peripheral face of the tangentially-cut ring assembly, each passage of the plurality of passages having a respective diameter, $d_i$, wherein $d_i$<2.6 mm, for each passage i, wherein each passage of the plurality of passages at the inner peripheral face of the tangentially-cut ring assembly is at least a distance of 1.5 mm from the second annular face at the inner peripheral face of the tangentially-cut ring assembly and no greater than a distance of 0.75*h from the second annular face at the inner peripheral face of the tangentially-cut ring assembly; and wherein the plurality of passages in the tangentially-cut ring assembly number at least $$\frac{\pi D}{(3h+d)},$$

where d is the mean value of the diameters of the plurality of passages.

2. The annular seal assembly as claimed in claim 1 wherein each passage of the plurality of passages extends to within at least 0.5 mm of the inner peripheral face of the tangentially-cut ring assembly.

3. The annular seal assembly as claimed in claim 1 wherein each passage of the plurality of passages extends through a distance no closer than 0.1 mm to the inner peripheral face of the tangentially-cut ring assembly.

4. The annular seal assembly as claimed in claim 1 wherein each passage of the plurality of passages extends through to the inner peripheral face of the tangentially-cut ring assembly.

5. The annular seal assembly as claimed in claim 1 wherein the annular seal assembly has an initial installed state and a later operating state, wherein each passage of the plurality of passages extends through a distance no closer than 0.1 mm to the inner peripheral face of the tangentially-cut ring assembly at the initial installed state, and wherein each passage of the plurality of passages extends through to the inner peripheral face of the tangentially-cut ring assembly at the later operating state.

6. The annular seal assembly as claimed in claim 5 wherein there is no groove connecting any passage of the plurality of passages to another passage of the plurality of passages at the inner peripheral face of the tangentially-cut ring assembly.

7. The annular seal assembly as claimed in claim 1 wherein the plurality of arcuate segments of the tangentially-cut ring assembly have mating end surfaces defined by planes extending generally tangent to said inner diameter.

8. The annular seal assembly as claimed in claim 1 wherein the plurality of arcuate segments of the tangentially-cut ring assembly have planar mating end surfaces which intersect straight radial lines at the inner peripheral face each at an included angle, a, of at least 90° and at most 150°.

9. The annular seal assembly as claimed in claim 1 wherein the plurality of arcuate segments of the radially-cut ring assembly have radially disposed end surfaces offset relative to the mating end surfaces of the plurality of arcuate segments of the tangentially-cut ring assembly.

10. The annular seal assembly as claimed in claim 1 wherein each of the passages of the plurality of passages is spaced apart one from another.

11. The annular seal assembly as claimed in claim 1 wherein the center-to-center distance between the passage openings of the plurality of passages are equally spaced apart, one from another.

12. The annular seal assembly as claimed in claim 1 further comprising a retention means holding the annular seal assembly in the annular configuration and resiliently biasing the seal assembly toward the reciprocating rod when located in the annular groove.

13. The annular seal assembly as claimed in claim 12 wherein the retention means is an annular spring.

14. The annular seal assembly as claimed in claim 1 wherein the plurality of passages in the tangentially-cut ring assembly number at most $$\frac{\pi D}{(2d)}.$$

* * * * *